(12) United States Patent
Tang et al.

(10) Patent No.: US 9,936,463 B2
(45) Date of Patent: Apr. 3, 2018

(54) METHOD FOR DETECTING A TERMINAL BY A BASE STATION, BASE STATION, AND NETWORK ENTITY

(71) Applicant: Huawei Technologies Co., Ltd., Shenzhen (CN)

(72) Inventors: Binsong Tang, Shenzhen (CN); Tianle Deng, Shanghai (CN); Haiyan Luo, Shanghai (CN); Hongzhuo Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 28 days.

(21) Appl. No.: 14/899,109

(22) PCT Filed: Sep. 28, 2012

(86) PCT No.: PCT/CN2012/082372
§ 371 (c)(1),
(2) Date: Dec. 16, 2015

(87) PCT Pub. No.: WO2014/047895
PCT Pub. Date: Apr. 3, 2014

(65) Prior Publication Data
US 2016/0212716 A1 Jul. 21, 2016

(51) Int. Cl.
*H04B 7/00* (2006.01)
*H04B 1/00* (2006.01)
(Continued)

(52) U.S. Cl.
CPC ......... *H04W 52/283* (2013.01); *H04W 8/005* (2013.01); *H04W 48/16* (2013.01);
(Continued)

(58) Field of Classification Search
CPC ................................................. H04W 52/283
(Continued)

(56) References Cited

U.S. PATENT DOCUMENTS

| 9,538,486 B1* | 1/2017 | Sitaram | ............... H04W 52/283 |
| 2006/0079235 A1 | 4/2006 | Kim | |
| 2012/0327909 A1* | 12/2012 | Koike | ................... H04W 24/08 370/331 |

FOREIGN PATENT DOCUMENTS

| CN | 101754314 A | 6/2010 |
| CN | 102378289 A | 3/2012 |

(Continued)

*Primary Examiner* — Tilahun B Gesesse
(74) *Attorney, Agent, or Firm* — Leydig, Voit & Mayer, Ltd.

(57) ABSTRACT

The application discloses a method implemented by a first base station, including: obtaining, first receive power information, where the first receive power information is receive power information of receiving a signal transmitted by user equipment served by a second base station; determining, according to the first receive power information, a relationship between the user equipment and a coverage area of the first base station; and notifying the second base station of the relationship. Thus, when user equipment approaches a network covered by a first base station, a second base station may know a relationship between the user equipment and the coverage area of the first base station, so as to perform a network handover for the user equipment or establish a wireless connection between the user equipment and the first base station. The embodiments of the present invention further provide a corresponding base station.

13 Claims, 9 Drawing Sheets

(51) Int. Cl.
  *H04B 1/04*     (2006.01)
  *H01Q 11/12*    (2006.01)
  *H04W 52/28*    (2009.01)
  *H04W 48/16*    (2009.01)
  *H04W 8/00*     (2009.01)
  *H04W 52/24*    (2009.01)
  *H04W 64/00*    (2009.01)
  *H04W 36/14*    (2009.01)

(52) U.S. Cl.
  CPC ....... *H04W 52/242* (2013.01); *H04W 64/006* (2013.01); *H04W 36/14* (2013.01)

(58) Field of Classification Search
  USPC .......................... 455/522, 67.13, 63.1, 226.1
  See application file for complete search history.

(56) References Cited

FOREIGN PATENT DOCUMENTS

| | | |
|---|---|---|
| CN | 102655649 A | 9/2012 |
| WO | WO 2011114372 A1 | 9/2011 |

* cited by examiner

METHOD FOR DETECTING A TERMINAL BY A BASE STATION, BASE STATION, AND NETWORK ENTITY

CROSS-REFERENCE TO RELATED APPLICATIONS

This application is a National Stage of International Patent Application No. PCT/CN2012/082372, filed on Sep. 28, 2012, which is hereby incorporated by reference in its entirety.

TECHNICAL FIELD

Embodiments of the present invention relates to the field of communications technologies, and in particular, to a method for detecting a terminal by a base station, a base station, and a network entity.

BACKGROUND

In a Long Term Evolution (LTE) wireless communications system, it becomes a mainstream trend for telecommunication operation to deploy a wireless local area network (WLAN) around an evolved NodeB (eNB) (or a mobile base station node B, a base station BS, a base transceiver station BTS, a wireless access point AP, and the like). In this communications system, LTE supports high-speed data transmission, and can resolve an issue of access in a case of high-speed movement, while the WLAN is suitable for low-speed access and supports a low-speed movement service. Therefore, the LTE and the WLAN need to coordinate. In a process that the LTE and the WALAN coordinate, user equipment (UE) needs to perform a network handover between the WLAN and an LTE base station.

At present, because an LTE base station cannot determine whether user equipment enters a coverage area of a neighboring network (for example, a WLAN) and cannot automatically perform a network handover for the user equipment, the user equipment still needs to perform a network handover between the WLAN and the LTE base station in a manner of manually selecting a network standard. For example, user equipment enters a supported range of a Wireless Fidelity (WiFi) network, and a user selects a WiFi network by using a network standard selection menu, so that the user equipment accesses the WiFi network. For another example, user equipment enters a service range of a Global System for Mobile Communications (GSM), and a user selects a GSM network by using a network standard selection menu, so that the user equipment accesses the GSM network. Apparently, how a base station serving user equipment obtains a location relationship between the user equipment and a coverage area of a neighboring network (for example, a WLAN) to select in time a network that is available for a handover for the user equipment is a problem that urgently needs to be resolved at present.

SUMMARY

The present invention provides a method for detecting a terminal by a base station, a base station, and a network entity. In the embodiments of present invention, a first base station determines, according to a receive power of receiving a signal transmitted by user equipment served by a second base station, a relationship between the user equipment and a coverage area of the first base station, and notifies the second base station of the relationship, so that the second base station may know in time the relationship between the user equipment and the coverage area of the first base station, so that when the user equipment arrives at a network area covered by the first base station, the first base station may perform a network handover for the user equipment in time.

A method for detecting a terminal by a base station includes:

obtaining, by a first base station, first receive power information, where the first receive power information is receive power information of receiving, by the first base station, a signal transmitted by user equipment served by a second base station;

determining, by the first base station according to the first receive power information, a relationship between the user equipment and a coverage area of the first base station; and notifying, by the first base station, the second base station of the relationship.

A first base station includes: a receiver, a processor, and a transmitter, where the processor is separately connected to the receiver and the transmitter, the receiver is configured to receive a signal transmitted by user equipment served by a second base station, to obtain first receive power information of receiving the signal of the user equipment, and transmit the first receive power information to the processor;

the processor is configured to receive the first receive power information transmitted by the receiver, determine, according to the first receive power information, a relationship between the user equipment and a coverage area of the first base station, and transmit the determined relationship to the transmitter; and the transmitter is configured to receive the relationship transmitted by the processor, and notify the second base station of the relationship.

A second base station includes a receiver and a memory, where the receiver is configured to receive a relationship, between the user equipment and a coverage area of the first base station, sent by the first base station; and the memory is configured to store the relationship, between the user equipment and the coverage area of the first base station, received by the receiver.

A method for detecting a terminal by a base station includes:

obtaining, by a second base station, first receive power information sent by a first base station, where the first receive power information is receive power information of receiving, by the first base station, a signal transmitted by user equipment served by the second base station; and determining, by the second base station according to the first receive power information, a relationship between the user equipment and a coverage area of the first base station.

A second base station includes a receiver, a processor, and a transmitter, where the processor is separately connected to the receiver and the transmitter, the receiver is configured to receive first receive power information sent by a first base station, where the first receive power information is receive power information of receiving, by the first base station, a signal transmitted by user equipment served by the second base station, and transmit the first receive power information to the processor; and the processor is configured to receive the first receive power information transmitted by the receiver, and determine, according to the first receive power information, a relationship between the user equipment and a coverage area of the first base station.

A first base station includes a memory and a transmitter, where the memory is configured to store first receive power information, and the transmitter is configured to send the first receive power information to the second base station, where the first receive power information is receive power information of receiving, by the first base station, a signal transmitted by user equipment served by the second base station.

A method for detecting a terminal by a base station includes:

obtaining, by a network entity, first receive power information sent by a first base station, where the first receive power information is receive power information of receiving, by the first base station, a signal transmitted by user equipment served by a second base station;

determining, by the network entity according to the first receive power information, a relationship between the user equipment and a coverage area of the first base station; and notifying, by the network entity, the second base station of the relationship.

A network entity includes: a receiver, a processor, and a transmitter, where the processor is separately connected to the receiver and the transmitter, the receiver is configured to first receive power information sent by a first base station, where the first receive power information is receive power information of receiving, by the first base station, a signal transmitted by user equipment served by a second base station, and transmit the first receive power information to the processor;

the processor is configured to receive the first receive power information transmitted by the receiver, determine, according to the first receive power information, a relationship between the user equipment and a coverage area of the first base station, and transmit the relationship to the transmitter; and the transmitter receives the relationship transmitted by the processor, and notifies the second base station of the relationship.

By means of the embodiments of the present invention, it is implemented that a second base station knows in time a relationship of user equipment served by the second base station and a coverage area of a first base station, so as to provide, to the user equipment in time, a service of a network handover or a service of establishing a connection with the first base station, thereby improving user experience.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
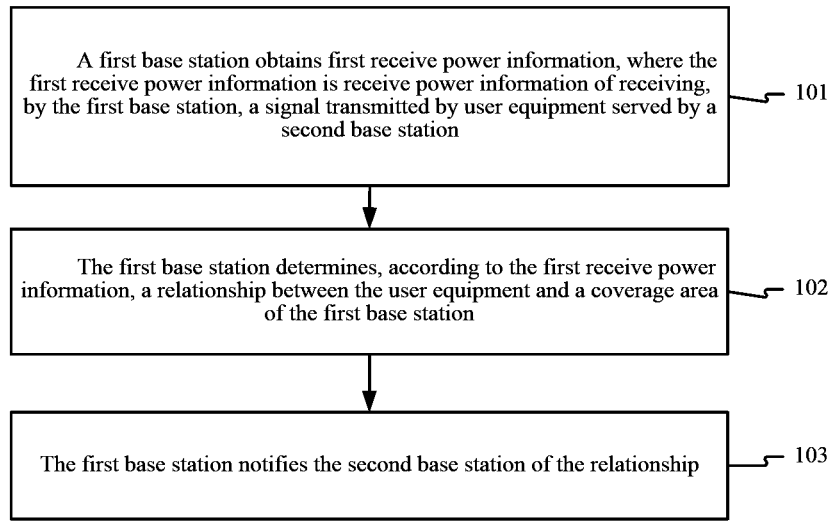
FIG. 1 is a schematic flowchart of a method for detecting a terminal by a base station according to Embodiment 1 of the present invention.
Figure 2:
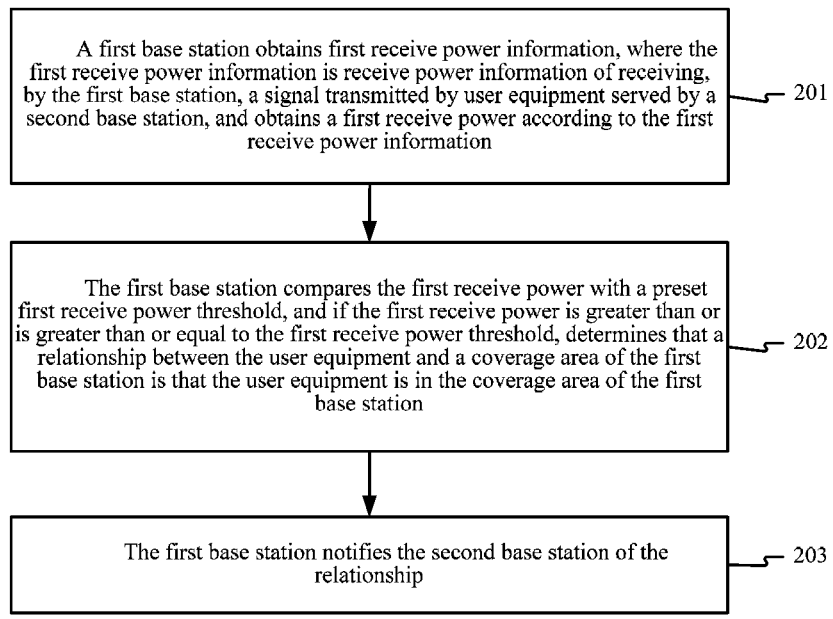
FIG. 2 is a schematic flowchart of a method for detecting a terminal by a base station according to Embodiment 2 of the present invention.

As shown in FIG. 1, a method for detecting a terminal by a base station in an embodiment of the present invention includes:

The method for detecting a terminal by a base station includes:

101: A first base station obtains first receive power information, where the first receive power information is receive power information of receiving, by the first base station, a signal transmitted by user equipment served by a second base station.

The first base station may be a neighboring base station of the second base station, detect the signal transmitted by the user equipment served by the second base station, to obtain the first receive power, and send the first receive power to the first base station.

102: The first base station determines, according to the first receive power information, a relationship between the user equipment and a coverage area of the first base station.

The first base station may obtain a first receive power according to the first receive power information. The first base station may determine, according to a value of the first receive power, the relationship between the user equipment and the coverage area of the first base station. For example, when the first receive power is greater than a preset threshold, it is determined that the user equipment arrives at the coverage area of the first base station.

103: The first base station notifies the second base station of the relationship.

For example, after the second base station obtains the relationship, if the relationship represents that the user equipment arrives at the coverage area of the first base station, the second base station may perform a network handover for the user equipment, or establish a connection with the first base station for the user equipment.

A first base station notifies a second base station of a relationship between the user equipment and a coverage area of the first base station, so that the second base station may know in time the relationship. After obtaining the relationship, the second base station adjusts, according to the relationship, a network connection of the user equipment. When the user equipment is in the coverage area of the first base station, the second base station may hand over the user equipment to a network provided by the first base station.

Embodiment 2

A method for detecting a terminal by a base station includes:

201: A first base station obtains first receive power information, where the first receive power information is receive power information of receiving, by the first base station, a signal transmitted by user equipment served by a second base station, and obtains the first receive power according to the first receive power information.

202: The first base station compares the first receive power with a preset first receive power threshold, and if the first receive power is greater than or equal to the first receive power threshold, determines that a relationship between the user equipment and a coverage area of the first base station is that the user equipment is in the coverage area of the first base station.

The preset first receive power threshold may be a historical value of the first receive power when the user equipment is in the coverage area of the first base station.

203: The first base station notifies the second base station of the relationship.

The obtaining, by a first base station, first receive power information includes: receiving, by the first base station, feature information, of the user equipment, sent by the second base station, and receive, according to the feature information of the user equipment, the signal transmitted by the user equipment, to obtain the first receive power.

Optionally, the feature information includes at least one of the following: a cell identifier, a user equipment identifier, configuration information for sending a wireless signal by the user equipment, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment.

Optionally, network standards of the first base station and the second base station are different, and the first base station supports receives a signal in the network standard of the second base station.

Optionally, the first base station and the second base station have a same network standard, but have different wireless frequencies, and the first base station supports reception of a signal at the wireless frequency of the second base station.

Optionally, the first base station supports reception of signals in multiple standards, where the signals in the multiple standards include one or more of a wireless local area network WLAN signal, a Worldwide Interoperability for Microwave Access WiMax signal, a Global System for Mobile Communications GSM signal, a third-generation mobile communication technology 3G signal, a ZigBee signal, a Bluetooth signal, and a Long Term Evolution LTE signal.

Optionally, the first base station is a wireless local area network WLAN base station, or is a ZigBee base station, or is a Bluetooth beacon.

Optionally, the second base station is a wireless local area network WLAN base station, or is a Worldwide Interoperability for Microwave Access WiMax base station, or is a Global System for Mobile Communications GSM base station, or is a third-generation mobile communication technology 3G base station, or is a ZigBee base station, or is a Bluetooth beacon, or is a Long Term Evolution LTE base station.

Embodiment 3

Figure 3:
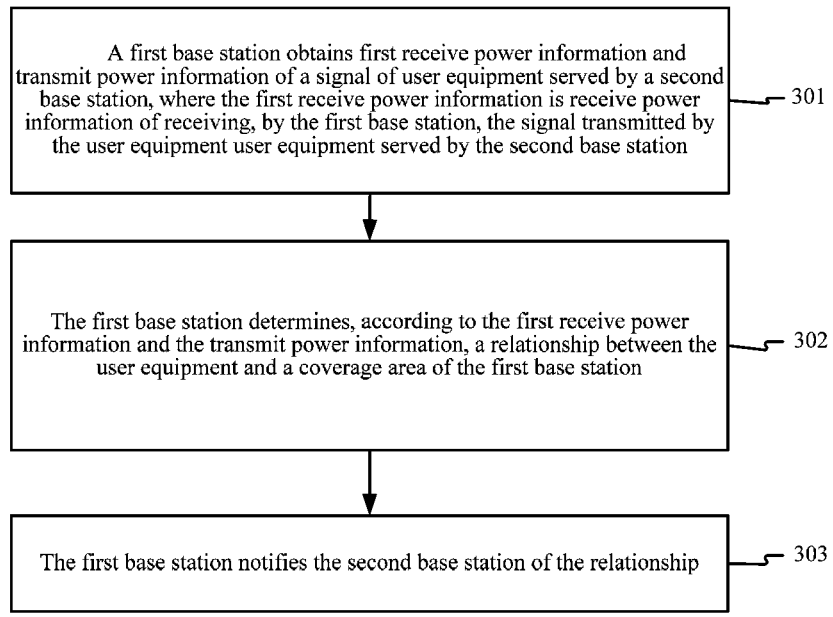
FIG. 3 is a schematic flowchart of a method for detecting a terminal by a base station according to Embodiment 3 of the present invention.

As shown in FIG. 3, a method for detecting a terminal by a base station includes:

301: A first base station obtains first receive power information and transmit power information of a signal of user equipment served by a second base station, where the first receive power information is receive power information of receiving, by the first base station, the signal transmitted by the user equipment served by the second base station.

302: The first base station determines, according to the first receive power information and the transmit power information, a relationship between the user equipment and a coverage area of the first base station.

303: The first base station notifies the second base station of the relationship.

The first base station may obtain a first receive power according to the first receive power information. The first base station may obtain, according to the transmit power information, a transmit power of the signal of the user equipment.

Optionally, the obtaining, by a first base station, transmit power information of a signal of user equipment includes:

receiving, by the first base station, the transmit power information, of the signal of the user equipment, sent by the second base station.

Optionally, the determining, by the first base station according to the first receive power information and the transmit power information, a relationship between the user equipment and a coverage area of the first base station includes:

receiving, by the first base station, second path loss information and second receive power information that are sent by the second base station, where the second path loss information is path loss information between the second base station and the user equipment, and the second receive power information is receive power information of receiving, by the second base station, the signal of the user equipment; and determining, by the first base station according to the first receive power information, the second path loss information, and the second receive power information, the relationship between the user equipment and the coverage area of the first base station.

The first base station may obtain a second path loss according to the second path loss information, where the second path loss is a path loss between the second base station and the user equipment. The first base station may obtain a second receive power according to the second receive power information, where the second receive power is a receive power of receiving, by the second base station, the signal of the user equipment.

For example, the first base station receives a second path loss and a second receive power that are sent by the second base station, where the second path loss is a path loss between the second base station and the user equipment, and the second receive power is a receive power of receiving, by the second base station, the signal of the user equipment; and the first base station calculates the transmit power of the signal of the user equipment according to the second path loss and the second receive power. The first base station determines, according to the calculated transmit power and the first receive power information, the relationship between the user equipment and the coverage area of the first base station.

Optionally, the determining, by the first base station according to the first receive power information and the transmit power information, a relationship between the user equipment and a coverage area of the first base station includes:

obtaining, by the first base station, second receive power information, transmit power information of the second base station, and third receive power information that are sent by the second base station, where the second receive power information is receive power information of receiving, by the second base station, the signal of the user equipment, and the third receive power information is receive power information of receiving, by the user equipment, a signal of the second base station; and determining, by the first base station according to the first receive power information, the second receive power information, the transmit power information of the second base station, and the third receive power information, the relationship between the user equipment and the coverage area of the first base station.

The first base station may obtain a second receive power according to the second receive power information, where the second receive power is a receive power of receiving, by the second base station, the signal of the user equipment. The first base station may obtain a third receive power according to the third receive power information, where the third receive power is the receive power of receiving, by the user equipment, the signal of the second base station.

For example, the first base station obtains a second receive power, a transmit power of the second base station, and a third receive power that are sent by the second base station, where the second receive power is a receive power of receiving, by the second base station, the signal of the user equipment, and the third receive power is the receive power of receiving, by the user equipment, the signal of the second base station; the first base station calculates a second path loss according to the transmit power of the second base station and the third receive power, where the second path loss is a path loss between the second base station and the user equipment, and the second path loss may be a difference between the transmit power of the second base station and the third receive power. The first base station calculates, according to the second path loss and the second receive power, the transmit power of the signal of the user equipment, where the transmit power of the signal of the user equipment may be a sum of the second path loss and the second receive power. The first base station determines, according to the calculated transmit power and the first receive power information, the relationship between the user equipment and the coverage area of the first base station.

Optionally, the determining, by the first base station according to the first receive power information and the transmit power information, a relationship between the user equipment and a coverage area of the first base station includes: calculating, by the first base station, a first path loss according to the first receive power information and the transmit power information, where the first path loss is a path loss of a wireless signal between the user equipment and the first base station; and comparing, by the first base station, the first path loss with a preset first path loss threshold, and if the first path loss is less than or equal to the preset first path loss threshold, determining that the user equipment is in the coverage area of the first base station.

Optionally, the determining, by the first base station according to the first receive power information and the transmit power information, a relationship between the user equipment and a coverage area of the first base station includes: obtaining, by the first base station, interference power information received by the first base station, calculating, by the first base station according to the first receive power information, the transmit power information, and the interference power information, signal quality of the signal of the user equipment, and determining, according to the signal quality, the relationship between the user equipment and the coverage area of the first base station.

The first base station may obtain, according to the interference power information received by the first base station, an interference power received by the first base station.

The calculating, by the first base station, signal quality of the signal of the user equipment may be specifically: calculating, according to the signal quality of the signal of the user equipment=the first receive power/(the transmit power+ the interference power), the signal quality of the signal of the user equipment.

The determining, according to the signal quality, the relationship between the user equipment and the coverage area of the first base station may be specifically: comparing the signal quality with a preset signal quality threshold, and if the signal quality is greater than or equal to the preset signal quality threshold, determining that the user equipment is in the coverage area of the first base station.

Optionally, the calculating, by the first base station, the first path loss is specifically: calculating, by the first base station, the first path loss according to a difference value between the first receive power and the transmit power.

Optionally, the obtaining, by a first base station, first receive power information includes: receiving, by the first base station, feature information, of the user equipment, sent by the second base station, and receiving, according to the feature information of the user equipment, the signal transmitted by the user equipment, to obtain the first receive power information.

Optionally, the feature information includes at least one of the following: a cell identifier, a user equipment identifier, configuration information for sending a wireless signal by a terminal, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment. The first base station may receive, according to the first time identifier, the signal of the user equipment corresponding to the transmit time, and obtain the first receive power of the signal of the user equipment corresponding to the transmit time.

Optionally, the first path loss threshold is a historical statistical average value of the first path loss of the user equipment.

Optionally, network standards of the first base station and the second base station are different, and the first base station supports receives a signal in the network standard of the second base station.

Optionally, the first base station and the second base station have a same network standard, but have different wireless frequencies, and the first base station supports reception of a signal at the wireless frequency of the second base station.

Optionally, the first base station supports reception of signals in multiple standards, where the signals in the multiple standards include one or more of a wireless local area network WLAN signal, a Worldwide Interoperability for Microwave Access WiMax signal, a Global System for Mobile Communications GSM signal, a third-generation mobile communication technology 3G signal, a ZigBee signal, a Bluetooth signal, and a Long Term Evolution LTE signal.

Optionally, the first base station is a wireless local area network WLAN base station, or is a ZigBee base station, or is a Bluetooth beacon.

Optionally, the first base station includes at least one base station of a wireless local area network WLAN base station, a Worldwide Interoperability for Microwave Access WiMax base station, a Global System for Mobile Communications GSM base station, a third-generation mobile communication technology 3G base station, a ZigBee base station, a Bluetooth beacon, and a Long Term Evolution LTE base station.

Optionally, a wireless local area network WLAN base station, or is a Worldwide Interoperability for Microwave Access WiMax base station, or is a Global System for Mobile Communications GSM base station, or is a third-generation mobile communication technology 3G base station, or is a ZigBee base station, or is a Bluetooth beacon, or is a Long Term Evolution LTE base station.

Figure 23:
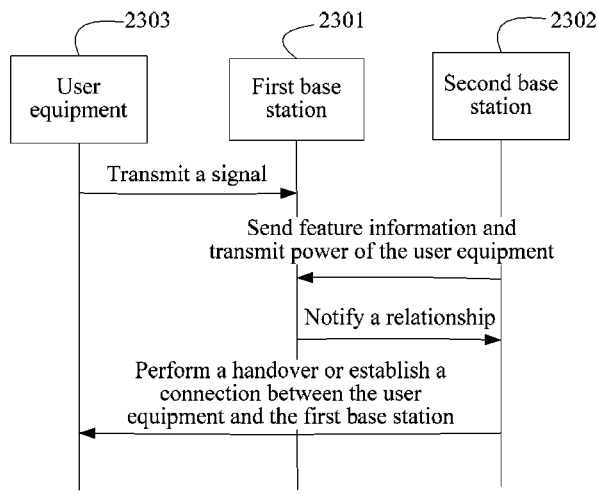
FIG. 23 is a signaling interaction diagram between base stations according to Embodiment 3 of the present invention.

As shown in FIG. 23, a first base station 2301 is a neighboring base station of a second base station 2302. The second base station 2302 sends, to the first base station 2301, feature information and a transmit power of a signal of user equipment 2303 served by the second base station 2302. The first base station 2301 receives the feature information and the transmit power. According to the feature information, the first base station 2301 receives the signal transmitted by the user equipment 2303 corresponding to the feature information, to obtain a receive power of the received signal of the user equipment 2303, and calculates a first path loss according to the receive power and the transmit power, where the first path loss is a path loss of a wireless signal between the user equipment 2303 and the first base station 2301. The first base station 2301 compares the first path loss with a preset first path loss threshold, and if the first path loss is less than or equal to the preset first path loss threshold, determines that the user equipment 2303 is in a coverage area of the first base station 2301, that is, determines that a relationship between the user equipment and the coverage area of the first base station 2301 is that the user equipment 2303 is in the coverage area of the first base station 2301; and notifies the second base station 2302 of the relationship, that is, sends a determination result to the second base station 2302. The second base station 2302 receives the determination result, and according to the determination result, the second base station 2302 may perform a network handover for the user equipment 2303, so as to establish a connection between the user equipment 2303 and the first base station 2301.

Embodiment 4

Figure 4:
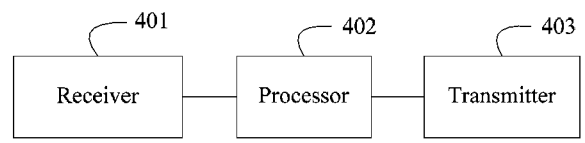
FIG. 4 is a structural block diagram of a first base station according to Embodiment 4 of the present invention.
Figure 5:
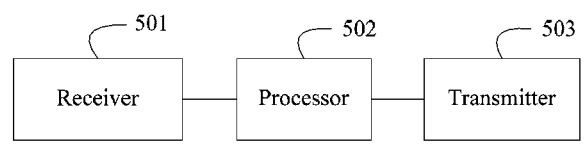
FIG. 5 is a structural block diagram of a first base station according to Embodiment 5 of the present invention.
Figure 6:
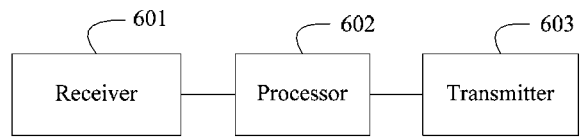
FIG. 6 is a structural block diagram of a first base station according to Embodiment 6 of the present invention.

As shown in FIG. 4, a first base station includes: a receiver 401, a processor 402, and a transmitter 403, where the processor 402 is separately connected to the receiver 401 and the transmitter 403.

The receiver 401 is configured to receive a signal transmitted by user equipment served by a second base station, to obtain first receive power information of receiving the signal of the user equipment, and transmit the first receive power information to the processor 402.

The processor 402 is configured to receive the first receive power information transmitted by the receiver 401, determine, according to the first receive power information, a relationship between the user equipment and a coverage area of the first base station, and transmit the determined relationship to the transmitter 403.

The transmitter 403 is configured to receive the relationship transmitted by the processor 402, and notify the second base station of the relationship.

Embodiment 5

A first base station includes: a receiver 501, a processor 502, and a transmitter 503, where the processor 502 is separately connected to the receiver 501 and the transmitter 503.

The receiver 501 is configured to receive a signal transmitted by user equipment served by a second base station, to obtain first receive power information of receiving the signal of the user equipment, and transmit the first receive power information to the processor 502.

The processor 502 is further configured to receive the first receive power information, to obtain the first receive power, compare the first receive power with a preset first receive power threshold, and if the first receive power is greater than or equal to the first receive power threshold, determine that a relationship between the user equipment and a coverage area of the first base station is that the user equipment is in the coverage area of the first base station, and transmit the determined relationship to the transmitter 503.

The transmitter 503 is configured to receive the relationship transmitted by the processor 502, and notify the second base station of the relationship.

Optionally, the receiver 501 is configured to receive feature information, of the user equipment, sent by the second base station, and receive, according to the feature information of the user equipment, the signal transmitted by the user equipment, to obtain the first receive power information.

Optionally, the feature information includes at least one of the following: a cell identifier, a user equipment identifier, configuration information for sending a wireless signal by the user equipment, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment.

Optionally, the first path loss threshold is a historical statistical average value of a first path loss of the user equipment.

Optionally, the receiver 501 supports reception of signals in multiple standards, where the signals in the multiple standards include one or more of a wireless local area network WLAN signal, a Worldwide Interoperability for Microwave Access WiMax signal, a Global System for Mobile Communications GSM signal, a third-generation mobile communication technology 3G signal, a ZigBee signal, a Bluetooth signal, and a Long Term Evolution LTE signal.

Embodiment 6

A first base station includes: a receiver 601, a processor 602, and a transmitter 603, where the processor 602 is separately connected to the receiver 601 and the transmitter 603.

The receiver 601 is configured to receive a signal transmitted by user equipment served by a second base station, to obtain first receive power information of receiving the signal of the user equipment, and transmit the first receive power information to the processor 602. The receiver 601 is further configured to obtain transmit power information of the signal of the user equipment, and transmit the transmit power information to the processor 602.

The processor 602 is configured to receive the first receive power information and the transmit power information that are transmitted by the receiver 601, determine, according to the first receive power information and the transmit power information, a relationship between the user equipment and a coverage area of the first base station, and transmit the determined relationship to the transmitter 603.

The transmitter 603 is configured to receive the relationship transmitted by the processor 602, and notify the second base station of the relationship.

Optionally, the receiver 601 is further configured to receive the transmit power information, of the signal of the user equipment, sent by the second base station.

Optionally, the receiver 601 is configured to receive second path loss information and second receive power information that are sent by the second base station, where the second path loss information is path loss information between the second base station and the user equipment, and the second receive power information is receive power information of receiving, by the second base station, the signal of the user equipment, and transmit the second path loss information and the second receive power information to the processor 602.

The processor 602 is configured to receive the second path loss information and the second receive power information that are transmitted by the receiver 601, and determine, according to the first receive power information, the second path loss information, and the second receive power information, the relationship between the user equipment and the coverage area of the first base station.

For example, the receiver 601 is configured to receive a second path loss and a second receive power that are sent by the second base station, where the second path loss is a path loss between the second base station and the user equipment, and the second receive power is a receive power of receiving, by the second base station, the signal of the user equipment, and transmit the second path loss and the second receive power to the processor 602.

The processor 602 is configured to receive the second path loss and the second receive power that are transmitted by the receiver 601, calculate, according to the second path loss and the second receive power, a transmit power of the signal of the user equipment, and determine, according to the first receive power and the transmit power of the signal of the user equipment, the relationship between the user equipment and the coverage area of the first base station.

Optionally, the receiver 601 is configured to obtain second receive power information, transmit power information of the second base station, and third receive power information that are sent by the second base station, where the second receive power information is receive power information of receiving, by the second base station, the signal of the user equipment, and the third receive power information is receive power information of receiving, by the user equipment, a signal of the second base station, and transmit the second receive power information, the transmit power information of the second base station, and the third receive power information to the processor 602.

The processor 602 is configured to receive the second receive power information, the transmit power information of the second base station, and the third receive power information that are transmitted by the receiver 601, and determine, according to the second receive power information, the transmit power information of the second base station, and the third receive power information, the relationship between the user equipment and the coverage area of the first base station.

For example, the receiver 601 is configured to obtain a second receive power, a power of a reference signal of the second base station, and a receive power of receiving, by the user equipment, the reference signal sent by the second base station that are sent by the second base station, where the second receive power is a receive power of receiving, by the second base station, the signal of the user equipment, and transmit the second receive power, the power of the reference signal, and the receive power of the reference signal to the processor 602.

The processor 602 is configured to receive the second receive power, the power of the reference signal, and the receive power of the reference signal that are transmitted by the receiver 601, calculate a second path loss according to the power of the reference signal and the receive power of the reference signal, where the second path loss is a path loss between the second base station and the user equipment, calculate, according to the second path loss and the second receive power, the transmit power of the signal of the user equipment, and determine, according to the first receive power and the transmit power, the relationship between the user equipment and the coverage area of the first base station.

Optionally, the processor 602 is configured to calculate a first path loss according to the first receive power information and the transmit power information, where the first path loss is a path loss of a wireless signal between the user equipment and the first base station, and compare the first path loss with a preset first path loss threshold, and if the first path loss is less than or equal to the preset first path loss threshold, determine that the user equipment is in the coverage area of the first base station.

Optionally, the receiver 601 is further configured to obtain interference power information received by the user equipment. The receiver 601 is further configured to calculate, according to the first receive power information, the transmit power information, and the interference power information, signal quality of the signal of the user equipment, and determine, according to the signal quality, the relationship between the user equipment and the coverage area of the first base station.

Optionally, the processor 602 is configured to calculate the first path loss according to a difference value between the first receive power information and the transmit power information.

Optionally, the receiver 601 is configured to receive feature information, of the user equipment, sent by the second base station, and receive, according to the feature information of the user equipment, the signal transmitted by the user equipment, to obtain the first receive power information.

Optionally, the feature information includes at least one of the following: a cell identifier, a user equipment identifier, configuration information for sending a wireless signal by a terminal, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment.

Optionally, the first path loss threshold is a historical statistical average value of the first path loss of the user equipment.

Optionally, the receiver 601 supports reception of signals in multiple standards, where the signals in the multiple standards include one or more of a wireless local area network WLAN signal, a Worldwide Interoperability for Microwave Access WiMax signal, a Global System for Mobile Communications GSM signal, a third-generation mobile communication technology 3G signal, a ZigBee signal, a Bluetooth signal, and a Long Term Evolution LTE signal.

Embodiment 7

Figure 7:
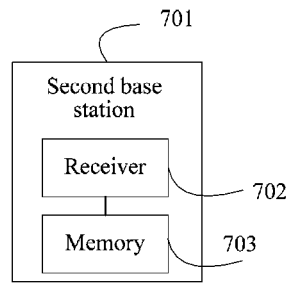
FIG. 7 is a structural block diagram of a second base station according to Embodiment 7 of the present invention.
Figure 8:
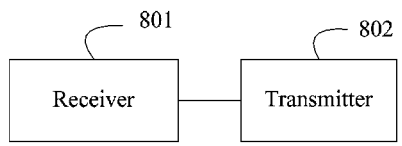
FIG. 8 is a structural block diagram of a second base station according to Embodiment 8 of the present invention.
Figure 9:
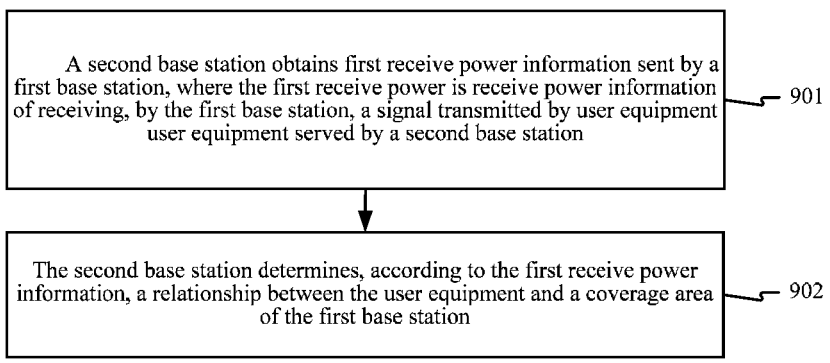
FIG. 9 is a schematic flowchart of a method for detecting a terminal by a base station according to Embodiment 9 of the present invention.
Figure 10:
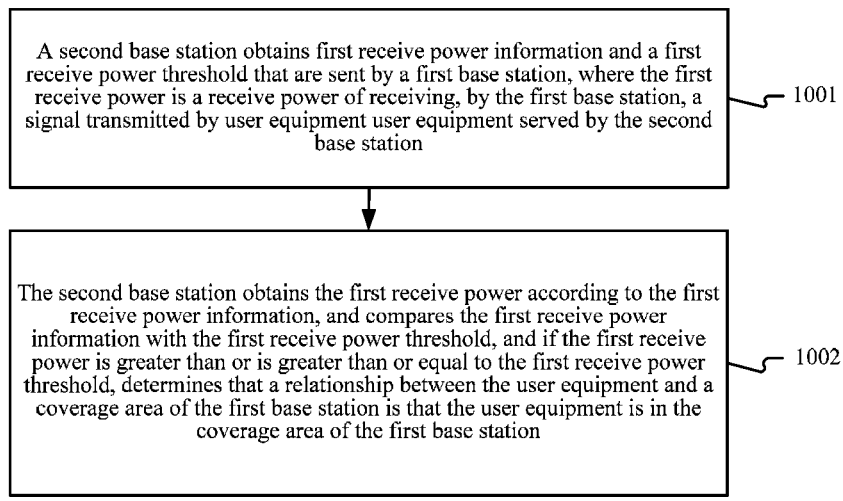
FIG. 10 is a schematic flowchart of a method for detecting a terminal by a base station according to Embodiment 10 of the present invention.

As shown in FIG. 7, a second base station 701 includes a receiver 702 and a memory 703.

The receiver 702 is configured to receive a relationship, between the user equipment and a coverage area of the first base station, sent by the first base station.

The memory 703 is configured to store the relationship, between the user equipment and the coverage area of the first base station, received by the receiver 702.

Embodiment 8

A second base station includes a transmitter 802 and a receiver 801.

The transmitter 802 is configured to send transmit power information of a signal of user equipment served by the second base station to a first base station.

The receiver 801 is configured to receive a relationship, between the user equipment and a coverage area of the first base station, sent by the first base station.

Optionally, the transmitter 802 is further configured to send a second path loss and second receive power information to the first base station, where the second path loss is a path loss between the second base station and the user equipment, and the second receive power information is receive power information of receiving, by the second base station, the signal of the user equipment.

Optionally, the transmitter 802 is further configured to send second receive power information, reference signal power information of the second base station, and third receive power information to the first base station, where the second receive power information is receive power information of receiving, by the second base station, the signal of the user equipment, and the third receive power information is receive power information of receiving, by the user equipment, a signal of the second base station.

Optionally, the transmitter 802 is further configured to send feature information of the user equipment to the first base station.

Optionally, the feature information of the user equipment includes at least one of the following: a cell identifier, a user equipment identifier, configuration information for sending a wireless signal by a terminal, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment.

Embodiment 9

A method for detecting a terminal by a base station includes:

901: A second base station obtains first receive power information sent by a first base station, where the first receive power information is receive power information of receiving, by the first base station, a signal transmitted by user equipment served by a second base station.

902: The second base station determines, according to the first receive power information, a relationship between the user equipment and a coverage area of the first base station.

Embodiment 10

A method for detecting a terminal by a base station includes:

1001: A second base station obtains first receive power information and a first receive power threshold that are sent by a first base station, where the first receive power is a receive power of receiving, by the first base station, a signal transmitted by user equipment served by the second base station.

1002: The second base station obtains the first receive power according to the first receive power information, and compares the first receive power information with the first receive power threshold, and if the first receive power is greater than or equal to the first receive power threshold, determines that a relationship between the user equipment and a coverage area of the first base station is that the user equipment is in the coverage area of the first base station.

Optionally, the method further includes:

before the obtaining, by a second base station, first receive power information sent by a first base station, sending, by the second base station, feature information of the user equipment to the first base station, so that the first base station receives the feature information of the user equipment sent by the second base station, receives, according to the feature information of the user equipment, the signal transmitted by the user equipment, to obtain the first receive power information, and sends the first receive power information to the second base station.

Optionally, the feature information includes at least one of the following: a cell identifier, a user equipment identifier, configuration information for sending a wireless signal by a terminal, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment.

Optionally, the first path loss threshold is a historical statistical average value of a first path loss of the user equipment.

Optionally, network standards of the first base station and the second base station are different, and the second base station supports reception of a signal in the network standard of the first base station.

Optionally, the first base station and the second base station have a same network standard, but have different wireless frequencies, and the second base station supports reception of a signal of the wireless frequency of the first base station.

Embodiment 11

Figure 11:
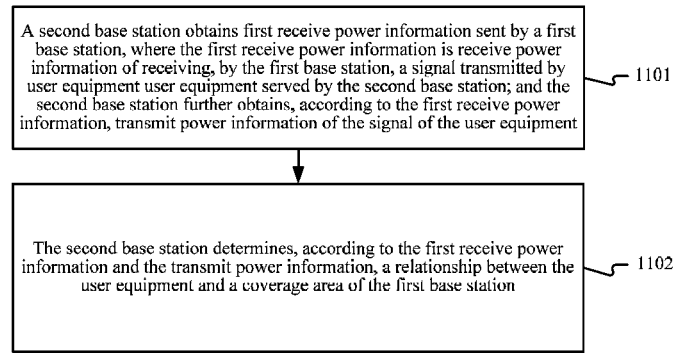
FIG. 11 is a schematic flowchart of a method for detecting a terminal by a base station according to Embodiment 11 of the present invention.
Figure 12:
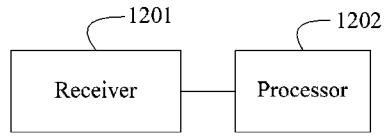
FIG. 12 is a structural block diagram of a second base station according to Embodiment 12 of the present invention.
Figure 13:
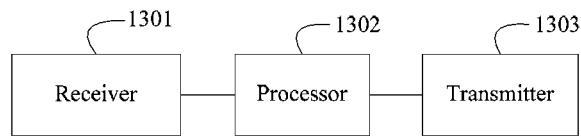
FIG. 13 is a structural block diagram of a second base station according to Embodiment 13 of the present invention.
Figure 14:
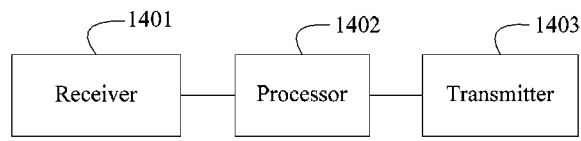
FIG. 14 is a structural block diagram of a second base station according to Embodiment 14 of the present invention.

As shown in FIG. 11, a method for detecting a terminal by a base station includes:

1101: A second base station obtains first receive power information sent by a first base station, where the first receive power information is receive power information of receiving, by the first base station, a signal transmitted by user equipment served by the second base station; and the second base station obtains, according to the first receive power information, transmit power information of the signal of the user equipment.

1102: The second base station determines, according to the first receive power information and the transmit power information, a relationship between the user equipment and a coverage area of the first base station.

Optionally, the determining, by the second base station according to the first receive power information and the transmit power information, a relationship between the user equipment and a coverage area of the first base station includes:

optionally, receiving, by the second base station, a first path loss threshold sent by the first base station;

optionally, calculating, by the second base station, a first path loss according to the first receive power information and the transmit power information, where the first path loss is a path loss of a wireless signal between the user equipment and the first base station; and optionally, comparing, by the second base station, the first path loss with the first path loss threshold, and if the first path loss is less than or equal to the preset first path loss threshold, determining that the user equipment is in the coverage area of the first base station.

Optionally, the determining, by the second base station according to the first receive power information and the transmit power information, a relationship between the user equipment and a coverage area of the first base station includes:

obtaining, by the second base station, interference power information that is received by the user equipment and that is received by the first base station;

calculating, by the second base station according to the first receive power information, the transmit power information, and the interference power information, signal quality of the signal of the user equipment, and determining, according to the signal quality, the relationship between the user equipment and the coverage area of the first base station.

For example, according to the first receive power information, the transmit power information, and the interference power information, the first receive power, the transmit power, and the interference power are obtained, and according to the signal quality of the signal of the user equipment=the first receive power/(the transmit power+the interference power), the signal quality of the signal of the user equipment is calculated, and according to the signal quality, the relationship between the user equipment and the coverage area of the first base station is determined.

Optionally, the method further includes:

before the obtaining, by a second base station, a first receive power sent by a first base station, sending, by the second base station, feature information of the user equipment to the first base station, so that the first base station receives the feature information of the user equipment sent by the second base station, receives, according to the feature information of the user equipment, the signal transmitted by the user equipment, to obtain the first receive power information, and sends the first receive power information to the second base station.

Optionally, the feature information includes at least one of the following: a cell identifier, a user equipment identifier, configuration information for sending a wireless signal by a terminal, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment.

Optionally, the first path loss threshold is a historical statistical average value of the first path loss of the user equipment.

Optionally, network standards of the first base station and the second base station are different, and the second base station supports reception of a signal in the network standard of the first base station.

Optionally, the first base station and the second base station have a same network standard, but have different wireless frequencies, and the second base station supports reception of a signal of the wireless frequency of the first base station.

Optionally, the first receive power information includes a second time identifier, where the second time identifier is used to represent a receive time of receiving, by the first base station, the signal of the user equipment. The second base station obtains a first receive power according to the first receive power information and the second time identifier, and the second base station may obtain, according to the first receive power and the second time identifier, the transmit power information of the signal of the user equipment corresponding to the receive time of the signal of the user equipment.

Figure 24:
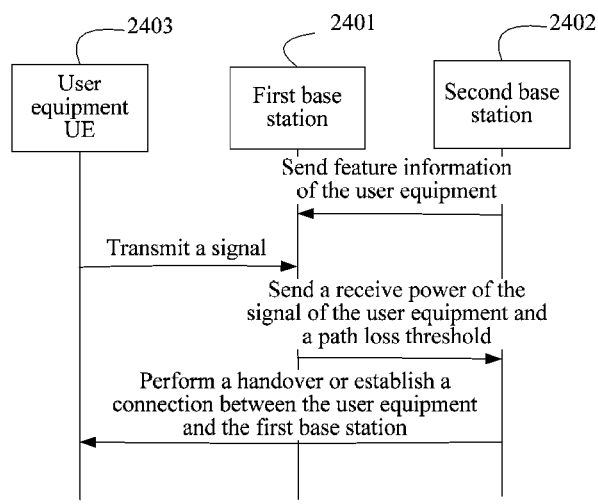
FIG. 24 is a signaling interaction diagram between base stations according to Embodiment 11 of the present invention.

As shown in FIG. 24, a first base station 2401 is a neighboring base station of a second base station 2402. The second base station 2402 sends, to the first base station 2401, feature information of a signal of user equipment 2403 served by the second base station 2402. The first base station 2401 receives the feature information. According to the feature information, the first base station 2401 receives the signal transmitted by the user equipment 2403 corresponding to the feature information, to obtain a receive power of the received signal of the user equipment 2403, sends the receive power to the second base station 2402, and sends a preset first path loss threshold to the second base station 2402. The second base station 2402 receives the receive power, to obtain a transmit power of the signal of the user equipment 2403, and determines, according to the transmit power of the signal of the user equipment 2403 of the second base station 2402 and the receive power, a relationship between the user equipment 2403 and a coverage area of the first base station 2401. The determining the relationship is specifically: The second base station 2402 may calculate a first path loss according to the transmit power of the signal of the user equipment 2403 of the second base station 2402 and the receive power, where the first path loss is a path loss of a wireless signal between the user equipment 2403 and the first base station 2401. If the first path loss is less than or equal to the preset first path loss threshold, it is determined that the user equipment 2403 is in the coverage area of the first base station 2401, that is, it is determined that the relationship between the user equipment 2403 and the coverage area of the first base station 2401 is that the user equipment 2403 is in the coverage area of the first base station 2401. The second base station 2402 may perform a network handover for the user equipment 2403 according to a determination result, so as to establish a connection between the user equipment 2403 and the first base station 2401.

Embodiment 12

A second base station includes a receiver 1201 and a processor 1202, where the processor 1202 is connected to the receiver 1201.

The receiver 1201 is configured to receive first receive power information sent by a first base station, where the first receive power information is receive power information of receiving, by the first base station, a signal transmitted by user equipment served by the second base station, and transmit the first receive power information to the processor 1202.

The processor 1202 is configured to receive the first receive power information transmitted by the receiver 1201, and determine, according to the first receive power information, a relationship between the user equipment and a coverage area of the first base station.

Embodiment 13

A second base station includes a receiver 1301 and a processor 1302, where the processor 1302 is connected to the receiver 1301.

The receiver 1301 is configured to receive first receive power information and a first receive power threshold that are sent by a first base station, where the first receive power information is receive power information of receiving, by the first base station, a signal transmitted by user equipment served by the second base station, and transmit the first receive power information to the processor 1302.

The processor 1302 is configured to receive the first receive power information and the first receive power information threshold that are transmitted by the receiver 1301, and compare the first receive power information with the first receive power information threshold, and if the first receive power information is greater than or equal to the first receive power information threshold, determine that a relationship between the user equipment and a coverage area of the first base station is that the user equipment is in the coverage area of the first base station.

Optionally, the second base station further includes a transmitter 1303, where the transmitter 1303 is connected to the processor 1302, and the transmitter 1303 is configured to: before the receiver 1301 receives the first receive power information, send feature information of the user equipment to the first base station, so that the first base station receives the feature information of the user equipment sent by the second base station, receives, according to the feature information of the user equipment, the signal transmitted by the user equipment, to obtain the first receive power information, and sends the first receive power information to the second base station.

Optionally, the feature information includes at least one of the following: a cell identifier, a user equipment identifier, configuration information for sending a wireless signal by a terminal, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment.

Optionally, the first path loss threshold is a historical statistical average value of a first path loss of the user equipment.

Optionally, the receiver 1301 supports reception of signals in multiple standards, where the signals in the multiple standards include one or more of a wireless local area network WLAN signal, a Worldwide Interoperability for Microwave Access WiMax signal, a Global System for Mobile Communications GSM signal, a third-generation mobile communication technology 3G signal, a ZigBee signal, a Bluetooth signal, and a Long Term Evolution LTE signal.

Embodiment 14

A second base station includes a receiver 1401, a processor 1402, and a transmitter 1403, where the processor 1402 is separately connected to the receiver 1402 and the transmitter 1403.

The receiver 1402 is configured to receive first receive power information sent by a first base station, where the first receive power information is receive power information of receiving, by the first base station, a signal transmitted by user equipment served by the second base station, and transmit the first receive power information to the processor 1402.

The processor 1402 is configured to receive the first receive power information transmitted by the receiver 1402, and is further configured to obtain, according to the first receive power information, transmit power information of the signal of the user equipment, and determine, according to the first receive power information and the transmit power information, a relationship between the user equipment and a coverage area of the first base station.

Optionally, the receiver 1402 is further configured to receive a first path loss threshold sent by the first base station, and transmit the first path loss threshold to the processor 1402.

The processor 1402 is further configured to receive the first path loss threshold transmitted by the receiver 1402, and compare the first path loss with the first path loss threshold, and if the first path loss is less than or equal to the preset first path loss threshold, determine that the user equipment is in the coverage area of the first base station.

Optionally, the receiver 1402 is further configured to acquire interference power information that is received by the user equipment and that is received by the first base station, and transmit the interference power information to the processor 1402.

The processor 1402 is further configured to receive the interference power information, calculate, according to the first receive power information, the transmit power information, and the interference power information, signal quality of the signal of the user equipment, and determine, according to the signal quality, the relationship between the user equipment and the coverage area of the first base station.

Optionally, the second base station further includes the transmitter 1403, where the transmitter 1403 is configured to: before the receiver 1402 receives the first receive power information, send feature information of the user equipment to the first base station, so that the first base station receives the feature information of the user equipment sent by the second base station, receives, according to the feature information of the user equipment, the signal transmitted by the user equipment, to obtain the first receive power information, and sends the first receive power information to the second base station.

Optionally, the feature information includes at least one of the following: a cell identifier, a user equipment identifier, configuration information for sending a wireless signal by a terminal, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment.

Optionally, the first path loss threshold is a historical statistical average value of the first path loss of the user equipment.

Optionally, the receiver 1402 supports reception of signals in multiple standards, where the signals in the multiple standards include one or more of a wireless local area network WLAN signal, a Worldwide Interoperability for Microwave Access WiMax signal, a Global System for Mobile Communications GSM signal, a third-generation mobile communication technology 3G signal, a ZigBee signal, a Bluetooth signal, and a Long Term Evolution LTE signal.

Embodiment 15

Figure 15:
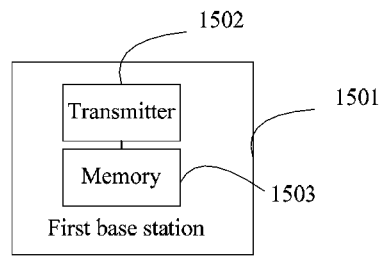
FIG. 15 is a structural block diagram of a first base station according to Embodiment 15 of the present invention.

A first base station 1501, as shown in FIG. 15, includes a transmitter 1502 and a memory 1503.

The memory 1503 is configured to store first receive power information.

The transmitter 1502 is configured to send the first receive power information stored by the memory 1503 to the second base station, where the first receive power information is receive power information of receiving, by the first base station, a signal transmitted by user equipment served by the second base station.

Embodiment 16

Figure 16:
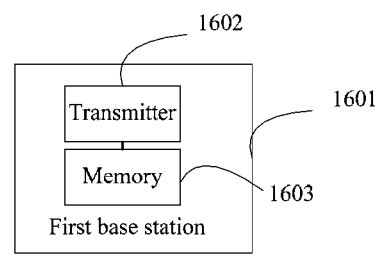
FIG. 16 is a structural block diagram of a first base station according to Embodiment 16 of the present invention.
Figure 17:
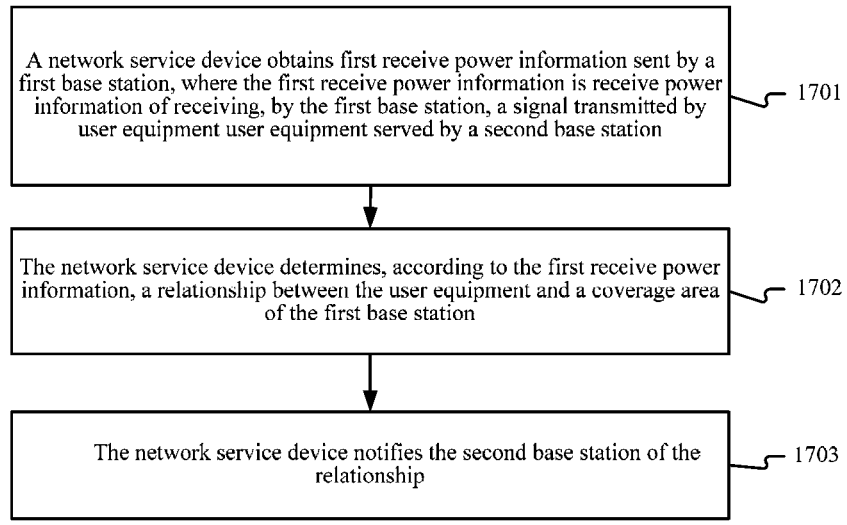
FIG. 17 is a schematic flowchart of a method for detecting a terminal by a base station according to Embodiment 17 of the present invention.
Figure 18:
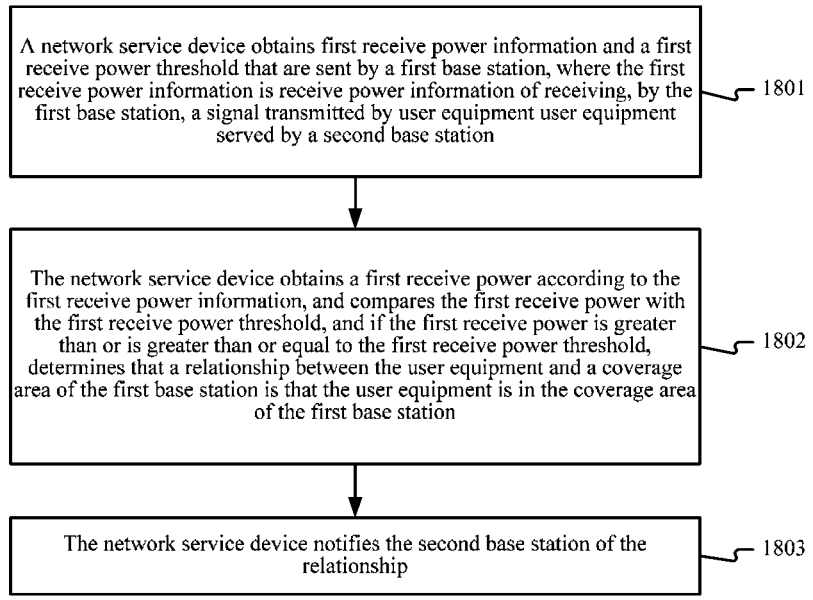
FIG. 18 is a schematic flowchart of a method for detecting a terminal by a base station according to Embodiment 18 of the present invention.
Figure 19:
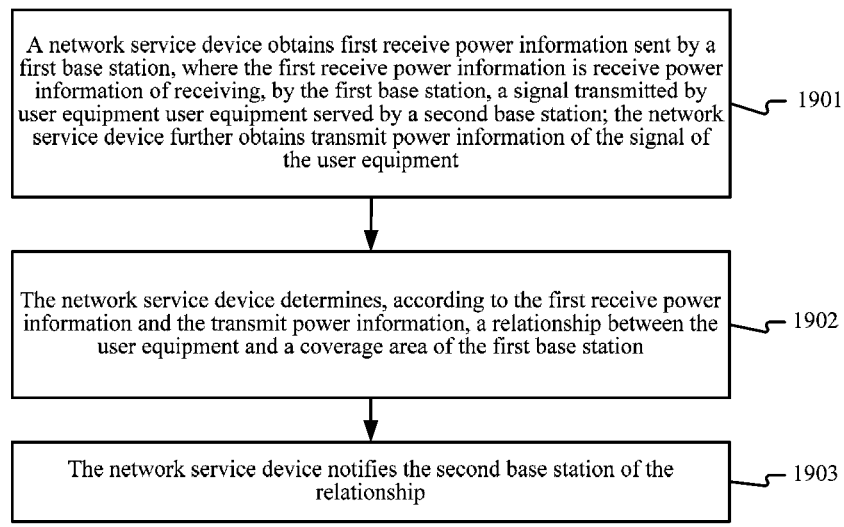
FIG. 19 is a schematic flowchart of a method for detecting a terminal by a base station according to Embodiment 19 of the present invention.
Figure 20:
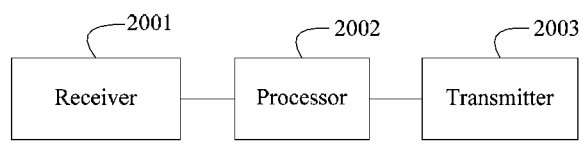
FIG. 20 is a structural block diagram of a network entity according to Embodiment 20 of the present invention.
Figure 21:
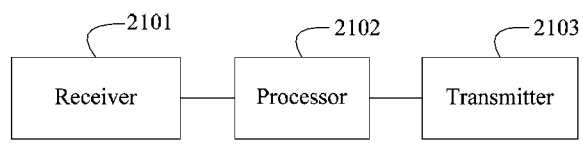
FIG. 21 is a structural block diagram of a network entity according to Embodiment 21 of the present invention.
Figure 22:
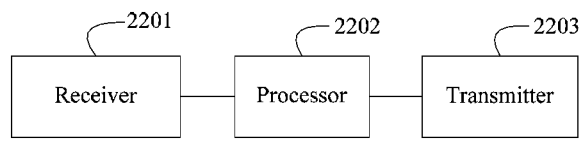
FIG. 22 is a structural block diagram of a network entity according to Embodiment 22 of the present invention.

A first base station 1601, as shown in FIG. 16, includes a transmitter 1602 and a memory 1603.

The memory 1603 is configured to store a first receive power information.

The transmitter 1602 is configured to send first receive power information stored by the memory 1603 to the second base station, where the first receive power information is receive power information of receiving, by the first base station, a signal transmitted by user equipment served by the second base station.

Optionally, the transmitter 1602 is further configured to send a first receive power threshold to the second base station.

Optionally, the transmitter 1602 is further configured to send a first path loss threshold to the second base station.

Optionally, the transmitter 1602 is further configured to send, to the second base station, interference power information that is received by the user equipment and that is received by the first base station.

Optionally, the first base station further includes a receiver and a processor, where the processor is separately connected to the receiver and the transmitter.

The receiver is configured to: before the transmitter sends the first receive power, receive feature information, of the user equipment, sent by the second base station, and transmit the feature information of the user equipment to the processor.

The processor is configured to receive the feature information, of the user equipment, transmitted by the receiver, receive, according to the feature information of the user equipment, the signal transmitted by the user equipment, to obtain the first receive power information, and transmit the first receive power information to the transmitter.

The transmitter is configured to receive the first receive power information transmitted by the processor, and send the first receive power information to the second base station.

Optionally, the feature information includes at least one of the following: a cell identifier, a user equipment identifier, configuration information for sending a wireless signal by a terminal, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment.

Optionally, the first path loss threshold is a historical statistical average value of a first path loss of the user equipment.

Embodiment 17

A method for detecting a terminal by a base station includes:

1701: A network entity obtains first receive power information sent by a first base station, where the first receive power information is receive power information of receiving, by the first base station, a signal transmitted by user equipment served by a second base station.

1702: The network entity determines, according to the first receive power information, a relationship between the user equipment and a coverage area of the first base station.

1703: The network entity notifies the second base station of the relationship.

Embodiment 18

A method for detecting a terminal by a base station includes:

1801: A network entity obtains first receive power information and a first receive power threshold that are sent by a first base station, where the first receive power information is receive power information of receiving, by the first base station, a signal transmitted by user equipment served by a second base station.

1802: The network entity obtains the first receive power according to the first receive power information, and compares the first receive power with the first receive power threshold, and if the first receive power is greater than or equal to the first receive power threshold, determines that a relationship between the user equipment and a coverage area of the first base station is that the user equipment is in the coverage area of the first base station.

1803: The network entity notifies the second base station of the relationship.

Optionally, before the obtaining, by a network entity, first receive power information, the method further includes: receiving, by the network entity, feature information, of the user equipment, sent by the second base station, and sending the feature information of the user equipment to the first base station, so that the first base station receives, according to the feature information of the user equipment, the signal transmitted by the user equipment, to obtain the first receive power information, and sends the first receive power information to the network entity.

Optionally, the feature information includes at least one of the following: a cell identifier, a user equipment identifier, configuration information for sending a wireless signal by a terminal, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment.

Optionally, the first path loss threshold is a historical statistical average value of a first path loss of the user equipment.

Embodiment 19

A method for detecting a terminal by a base station includes:

1901: A network entity obtains first receive power information sent by a first base station, where the first receive power information is receive power information of receiving, by the first base station, a signal transmitted by user equipment served by a second base station. The network entity further obtains transmit power information of the signal of the user equipment.

1902: The network entity determines, according to the first receive power information and the transmit power information, a relationship between the user equipment and a coverage area of the first base station.

1903: The network entity notifies the second base station of the relationship.

Optionally, the obtaining, by the network entity, a transmit power information of the signal of the user equipment includes: receiving, by the network entity, the transmit power, of the signal of the user equipment, sent by the second base station.

Optionally, the determining, by the network entity according to the first receive power information and the transmit power information, a relationship between the user equipment and a coverage area of the first base station includes:

receiving, by the network entity, second path loss information and second receive power information that are sent by the second base station, where the second path loss is a path loss between the second base station and the user equipment, and the second receive power information is receive power information of receiving, by the second base station, the signal of the user equipment; and determining, by the network entity according to the first receive power information, the second path loss information, and the second receive power information, the relationship between the user equipment and the coverage area of the first base station.

For example, the network entity receives a second path loss and a second receive power that are sent by the second base station, where the second path loss is a path loss between the second base station and the user equipment, and the second receive power is a receive power of receiving, by the second base station, the signal of the user equipment.

The network entity calculates, according to the second path loss and the second receive power, the transmit power of the signal of the user equipment. The transmit power of the signal of the user equipment is equal to a sum of the second path loss and the second receive power.

The network entity determines, according to the transmit power of the signal of the user equipment and the first receive power, the relationship between the user equipment and the coverage area of the first base station.

Optionally, the determining, by the network entity according to the first receive power information, a relationship between the user equipment and a coverage area of the first base station includes:

obtaining, by the network entity, second receive power information, transmit power information of the second base station, and third receive power information that are sent by the second base station, where the second receive power information is receive power information of receiving, by the second base station, the signal of the user equipment, and the third receive power information is receive power information of receiving, by the user equipment, a signal of the second base station; and determining, by the network entity according to the first receive power information, the second receive power information, the transmit power information of the second base station, and the third receive power information, the relationship between the user equipment and the coverage area of the first base station.

For example, the network entity obtains a second receive power, the transmit power of the second base station, and a third receive power that are sent by the second base station, where the second receive power is a receive power of receiving, by the second base station, the signal of the user equipment, and the third receive power is the receive power of receiving, by the user equipment, the signal of the second base station.

The network entity calculates a second path loss according to the transmit power of the second base station and the third receive power, where the second path loss is a path loss between the second base station and the user equipment, and the second path loss may be a difference between the transmit power of the second base station and the third receive power.

The network entity calculates, according to the second path loss and the second receive power, the transmit power of the signal of the user equipment. The transmit power of the signal of the user equipment may be a sum of the second path loss and the second receive power.

Optionally, the determining, by the network entity according to the first receive power information and the transmit power information, a relationship between the user equipment and a coverage area of the first base station includes:

calculating, by the network entity, a first path loss according to the first receive power information and the transmit power information, where the first path loss is a path loss of a wireless signal between the user equipment and the first base station;

obtaining, by the network entity, a first path loss threshold sent by the first base station; and comparing, by the network entity, the first path loss with the first path loss threshold, and if the first path loss less than the first path loss threshold, determining that the user equipment is in the coverage area of the first base station.

Optionally, the determining, by the network entity according to the first receive power information and the transmit power information, a relationship between the user equipment and a coverage area of the first base station includes:

obtaining, by the network entity, interference power information, which is received by the user equipment and which is received by the first base station, sent by the first base station; and calculating, by the network entity according to the first receive power information, the transmit power information, and the interference power information, signal quality of the signal of the user equipment, and determining, according to the signal quality, the relationship between the user equipment and the coverage area of the first base station.

Optionally, the calculating, by the network entity, a first path loss is specifically: calculating, by the network entity, the first path loss according to a difference value between the first receive power and the transmit power.

Optionally, before the obtaining, by a network entity, first receive power information, the method further includes: receiving, by the network entity, feature information, of the user equipment, sent by the second base station, and sending the feature information of the user equipment to the first base station, so that the first base station receives, according to the feature information of the user equipment, the signal transmitted by the user equipment, to obtain the first receive power information, and sends the first receive power information to the network entity.

Optionally, the feature information includes at least one of the following: a cell identifier, a user equipment identifier, configuration information for sending a wireless signal by a terminal, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment.

Optionally, the first path loss threshold is a historical statistical average value of the first path loss of the user equipment.

Optionally, the first receive power information includes a second time identifier, where the second time identifier is used to represent a receive time of receiving, by the first base station, the signal of the user equipment. The network entity obtains the first receive power and the second time identifier according to the first receive power information, and the network entity may obtain the transmit power information of the signal of the user equipment corresponding to the first receive power.

Figure 25:
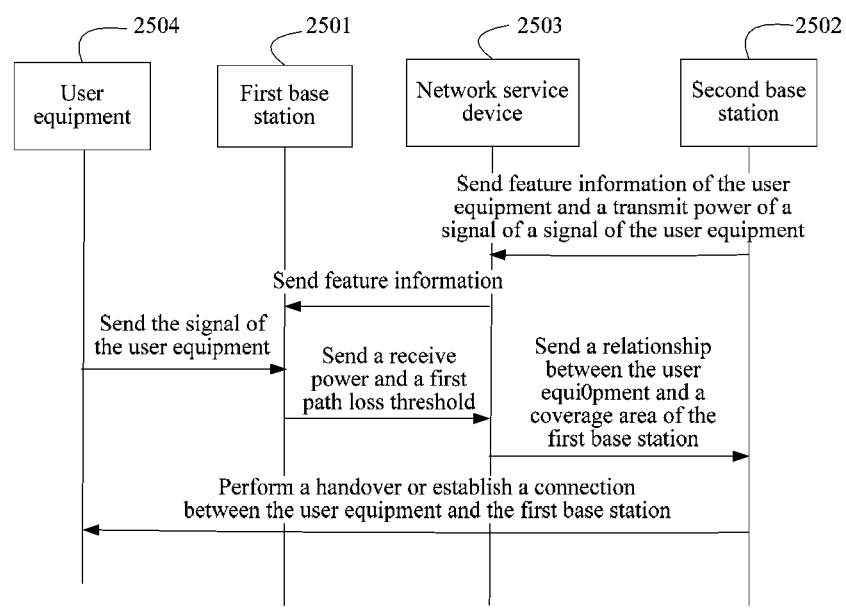
FIG. 25 is a signaling interaction diagram between base stations according to Embodiment 19 of the present invention.

As shown in FIG. 25, a network entity receives feature information of user equipment and a transmit power of a signal of the user equipment, where the feature information and the transmit power are sent by a second base station, and forwards the feature information and the transmit power to a first base station; the first base station receives the feature information, receives, according to the feature information, a receive power of the signal transmitted by the user equipment, and sends, to a network server, a first path loss threshold preset on the first base station and the receive power. The network entity calculates a first path loss according to the receive power and the transmit power, where the first path loss is a path loss of a wireless signal between the user equipment and the first base station. The network entity compares the first path loss with the first path loss threshold, and determines a relationship between the user equipment and a coverage area of the second base station. If the first path loss threshold is less than or equal to the preset first path loss threshold, it is determined that the user equipment is in the coverage area of the first base station, and the second base station may perform a network handover or establish a connection between the user equipment and the first base station.

Embodiment 20

A network entity includes: a receiver 2001, a processor 2002, and a transmitter 2003, where the processor 2002 is separately connected to the receiver 2001 and the transmitter 2003.

The receiver 2001 is configured to first receive power information sent by a first base station, where the first receive power information is receive power information of receiving, by the first base station, a signal transmitted by user equipment served by a second base station, and transmit the first receive power information to the processor 2002.

The processor 2002 is configured to receive the first receive power information transmitted by the receiver 20012003, determine, according to the first receive power information, a relationship between the user equipment and a coverage area of the first base station, and transmit the relationship to the transmitter 2003.

The transmitter 2003 receives the relationship transmitted by the processor 2002, and notifies the second base station of the relationship.

Embodiment 21

A network entity includes: a receiver 2101, a processor 2102, and a transmitter 2103, where the processor 2102 is separately connected to the receiver 2101 and the transmitter 2103.

The receiver 2101 is configured to first receive power information and a first receive power information threshold that are sent by a first base station, where the first receive power information is receive power information of receiving, by the first base station, a signal transmitted by user equipment served by a second base station, and transmit the first receive power information and the first receive power information-threshold to the processor 2102.

The processor 2102 is configured to receive the first receive power information and the first receive power threshold that are transmitted by the receiver 2101, to obtain the first receive power according to the first receive power information, and compare the first receive power information with the first receive power threshold, and if the first receive power information is greater than or equal to the first receive power threshold, determine that a relationship between the user equipment and a coverage area of the first base station is that the user equipment is in the coverage area of the first base station.

Optionally, the receiver 2101 is configured to: before the receiver 2101 obtains the first receive power information, receive feature information, of the user equipment, sent by the second base station, and transmit the feature information of the user equipment to the transmitter 2103.

The transmitter 2103 is configured to receive the feature information of the user equipment transmitted by the receiver 2101, and send the feature information of the user equipment to the first base station, so that the first base station receives, according to the feature information of the user equipment, the signal transmitted by the user equipment, to obtain the first receive power information, and sends the first receive power information to the network entity.

Optionally, the feature information includes at least one of the following: a cell identifier, a user equipment identifier, configuration information for sending a wireless signal by a terminal, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment.

Optionally, the first path loss threshold is a historical statistical average value of a first path loss of the user equipment.

Embodiment 22

A network entity includes: a receiver 2201, a processor 2202, and a transmitter 2203, where the processor 2202 is separately connected to the receiver 2101 and the transmitter 2203.

The receiver 2201 is configured to first receive power information sent by a first base station, where the first receive power information is receive power information of receiving, by the first base station, a signal transmitted by user equipment served by a second base station, and transmit the first receive power information to the processor 2202. The receiver 2201 is further configured to obtain transmit power information of the signal of the user equipment, and transmit the transmit power information to the processor 2202.

The processor 2202 is configured to receive the first receive power information and the transmit power information that are transmitted by the receiver 2201, determine, according to the first receive power information and the transmit power information, a relationship between the user equipment and a coverage area of the first base station, and transmit the relationship to the transmitter 2203.

The transmitter 2203 receives the relationship transmitted by the processor 2202, and notifies the second base station of the relationship.

Optionally, the receiver 2201 is configured to receive second path loss information and second receive power information that are sent by the second base station, where the second path loss information is path loss information between the second base station and the user equipment, and the second receive power information is receive power information of receiving, by the second base station, the signal of the user equipment, and transmit the second path loss information and the second receive power information to the processor 2202.

The processor 2202 is configured to receive the second path loss information and the second receive power information that are transmitted by the receiver 2201, and determine, according to the first receive power information, the second path loss information, and the second receive power information, the relationship between the user equipment and the coverage area of the first base station.

For example, the receiver 2201 is configured to receive a second path loss and a second receive power that are sent by the second base station, where the second path loss is a path loss between the second base station and the user equipment, and the second receive power is a receive power of receiving, by the second base station, the signal of the user equipment, and transmit the second path loss and the second receive power to the processor 2202.

The processor 2202 is configured to receive the second path loss and the second receive power that are transmitted by the receiver 2201, and calculate, according to the second path loss and the second receive power, a transmit power of the signal of the user equipment.

The processor 2202 determines, according to the transmit power of the signal of the user equipment and the first receive power, the relationship between the user equipment and the coverage area of the first base station.

Optionally, the receiver 2201 is further configured to obtain second receive power information, transmit power information of the second base station, and third receive power information that are sent by the second base station, where the second receive power information is receive power information of receiving, by the second base station, the signal of the user equipment, and the third receive power information is receive power information of receiving, by the user equipment, a signal of the second base station, and transmit the second receive power information, the transmit power information of the second base station, and the third receive power information to the processor 2202.

The processor 2202 receives the second receive power information, the transmit power information of the second base station, and the third receive power information that are transmitted by the receiver 2201, and determines, according to the first receive power information, the second receive power information, the transmit power information of the second base station, and the third receive power information, the relationship between the user equipment and the coverage area of the first base station.

For example, the receiver 2201 is further configured to obtain a second receive power, a transmit power of the second base station, and a third receive power that are sent by the second base station, where the second receive power is a receive power of receiving, by the second base station, the signal of the user equipment, and the third receive power is the receive power of receiving, by the user equipment, the signal of the second base station, and transmit the second receive power, the transmit power of the second base station, and the third receive power to the processor 2202.

The processor 2202 receives the second receive power, the transmit power of the second base station, and the third receive power transmitted by the receiver 2201, calculates a second path loss according to a transmit power of the second base station and the third receive power, where the second path loss is a path loss between the second base station and the user equipment, and the second path loss may be a difference between the transmit power of the second base station and the third receive power, and calculates, according to the receive power of the second base station and the second path loss, the transmit power of the signal of the user equipment, where the transmit power of the signal of the user equipment may be a sum of the receive power of the second base station and the second path loss.

Optionally, the receiver 2201 is further configured to obtain a first path loss threshold sent by the first base station, and transmit the first path loss threshold to the processor 2202.

The processor 2202 is further configured to receive the first path loss threshold transmitted by the receiver 2201, calculate a first path loss according to the first receive power information and the transmit power information, where the first path loss is a path loss of a wireless signal between the user equipment and the first base station, and compare the first path loss with the first path loss threshold, and if the first path loss is less than the first path loss threshold, determine that the user equipment is in the coverage area of the first base station.

Optionally, the receiver 2201 is configured to obtain interference power information, which is received by the user equipment and which is received by the first base station, sent by the first base station, and transmit the interference power information to the processor 2202.

The processor 2202 is configured to receive the interference power information transmitted by the receiver 2201, calculate, according to the first receive power information, the transmit power information, and the interference power information, signal quality of the signal of the user equipment, and determine, according to the signal quality, the relationship between the user equipment and the coverage area of the first base station.

Optionally, the processor 2202 calculates the first path loss according to a difference value between the first receive power and the transmit power.

Optionally, the receiver 2201 is configured to: before the receiver 2201 obtains the first receive power, receive feature information, of the user equipment, sent by the second base station, and transmit the feature information of the user equipment to the transmitter 2203.

The transmitter 2203 is configured to receive the feature information, of the user equipment, transmitted by the receiver 2201, and send the feature information of the user equipment to the first base station, so that the first base station receives, according to the feature information of the user equipment, the signal transmitted by the user equipment, to obtain the first receive power information, and sends the first receive power information to the network entity.

Optionally, the feature information includes at least one of the following: a cell identifier, a user equipment identifier, configuration information for sending a wireless signal by a terminal, code resource information, time-domain resource information, frequency-domain resource information, spatial-domain resource information, time-frequency resource information, a training signal, a channel sounding reference signal, a demodulation reference signal, and a pilot signal.

Optionally, the feature information includes a first time identifier, where the first time identifier is used to represent a transmit time of the signal of the user equipment.

Optionally, the first receive power information includes a second time identifier, where the second time identifier is used to represent a receive time of receiving, by the first base station, the signal of the user equipment. The network entity obtains the first receive power and the second time identifier according to the first receive power information, and the network entity may obtain the transmit power information of the signal of the user equipment corresponding to the first receive power.

Optionally, the first path loss threshold is a historical statistical average value of the first path loss of the user equipment.

The method for detecting a terminal by a base station and the base station, the network entity provided in the embodiments of the present invention are described in detail above. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A method for detecting a terminal by a base station, comprising:

obtaining, by a first base station, first receive power information, wherein the first receive power information is receive power information of a signal received by the first base station and transmitted by user equipment served by a second base station;

determining, by the first base station according to the first receive power information, a relationship between the user equipment and a coverage area of the first base station; and notifying, by the first base station, the second base station of the relationship, wherein the determining, by the first base station according to the first receive power information, a relationship between the user equipment and a coverage area of the first base station comprises:

receiving by the first base station second path loss information and second receive power information that are sent by the second base station, wherein the second path loss information is path loss information between the second base station and the user equipment, and the second receive power information is receive power information of receiving, by the second base station, the signal of the user equipment; and determining, by the first base station according to the first receive power information, the second path loss information, and the second receive power information, the relationship between the user equipment and the coverage area of the first base station.

2. The method for detecting a terminal by a base station according to claim 1, wherein the determining, by the first base station according to the first receive power information, a relationship between the user equipment and a coverage area of the first base station comprises:

obtaining, by the first base station, a first receive power according to the first receive power information; and comparing, by the first base station, the first receive power with a preset first receive power threshold, and in a condition that the first receive power is greater than or equal to the first receive power threshold, determining that the user equipment is in the coverage area of the first base station.

3. The method for detecting a terminal by a base station according to claim 1, wherein the determining, by the first base station according to the first receive power information, a relationship between the user equipment and a coverage area of the first base station comprises:

obtaining, by the first base station, transmit power information of the signal of the user equipment; and determining, by the first base station according to the first receive power information and the transmit power information, the relationship between the user equipment and the coverage area of the first base station.

4. The method for detecting a terminal by a base station according to claim 3, wherein the obtaining, by the first base station, transmit power information of the signal of the user equipment comprises: receiving, by the first base station, the transmit power information, of the signal of the user equipment, sent by the second base station.

5. The method for detecting a terminal by a base station according to claim 1, wherein the determining, by the first base station according to the first receive power information, a relationship between the user equipment and a coverage area of the first base station comprises:

obtaining, by the first base station, second receive power information, transmit power information of the second base station, and third receive power information that are sent by the second base station, wherein the second receive power information is receive power information of receiving, by the second base station, the signal of the user equipment, and the third receive power information is receive power information of receiving, by the user equipment, a signal of the second base station; and determining, by the first base station according to the first receive power information, the second receive power information, the transmit power information of the second base station, and the third receive power information, the relationship between the user equipment and the coverage area of the first base station.

6. The method for detecting a terminal by a base station according to claim 1, wherein the obtaining, by a first base station, first receive power information comprises: receiving, by the first base station, feature information, of the user equipment, sent by the second base station, and receiving, according to the feature information of the user equipment, the signal transmitted by the user equipment, to obtain the first receive power information.

7. The method for detecting a terminal by a base station according to claim 6, wherein the feature information is one or combination of the following: a cell identifier, a user equipment identifier, configuration information for sending a wireless signal by the user equipment, code resource information, time-domain resource information, frequency-domain resource information, spatial-domain resource information, time-frequency resource information, a training signal, a channel sounding reference signal, a demodulation reference signal, and a pilot signal.

8. A first base station, comprising: a receiver, a processor, and a transmitter, wherein:

the processor is separately connected to the receiver and the transmitter, the receiver is configured to receive a signal transmitted by user equipment served by a second base station, to obtain first receive power information of the signal received from the user equipment, and transmit the first receive power information to the processor;

the processor is configured to receive the first receive power information transmitted by the receiver, determine, according to the first receive power information, a relationship between the user equipment and a coverage area of the first base station, and transmit the determined relationship to the transmitter; and the transmitter is configured to receive the relationship transmitted by the processor, and notify the second base station of the relationship, wherein when the processor is configured to determine according to the first receive power information, the relationship between the user equipment and the coverage area of the first base station, the receiver is further configured to:

receive second path loss information and second receive power information that are sent by the second base station, wherein the second path loss information is path loss information between the second base station and the user equipment, and the second receive power information is receive power information of receiving, by the second base station, the signal of the user equipment; and the processor is configured to:

determine, according to the first receive power information, the second path loss information, and the second receive power information, the relationship between the user equipment and the coverage area of the first base station.

9. The first base station according to claim 8, wherein the processor is configured to obtain a first receive power according to the first receive power information; and the processor is further configured to compare the first receive power with a preset first receive power threshold, and in a condition that the first receive power is greater than or equal to the first receive power threshold, determine that the user equipment is in the coverage area of the first base station.

10. The first base station according to claim 8, wherein the receiver is further configured to obtain transmit power information of the signal of the user equipment, and transmit the transmit power information to the processor; and the processor is configured to receive the transmit power information transmitted by the receiver, and determine, according to the first receive power information and the transmit power information, the relationship between the user equipment and the coverage area of the first base station.

11. The first base station according to claim 10, wherein the receiver is further configured to receive transmit power information, of the signal of the user equipment, sent by the second base station.

12. The first base station according to claim 8, wherein the receiver is configured to receive feature information, of the user equipment, sent by the second base station, and receive, according to the feature information of the user equipment, the signal transmitted by the user equipment, to obtain the first receive power information.

13. The first base station according to claim 12, wherein the feature information comprises one or combination of the following: a cell identifier, a user equipment identifier, configuration information for sending a wireless signal by a terminal, code resource information, time-domain resource information, frequency-domain resource information, spatial-domain resource information, time-frequency resource information, a training signal, a channel sounding reference signal, a demodulation reference signal, and a pilot signal.

* * * * *